United States Patent Office 2,770,714
Patented Nov. 13, 1956

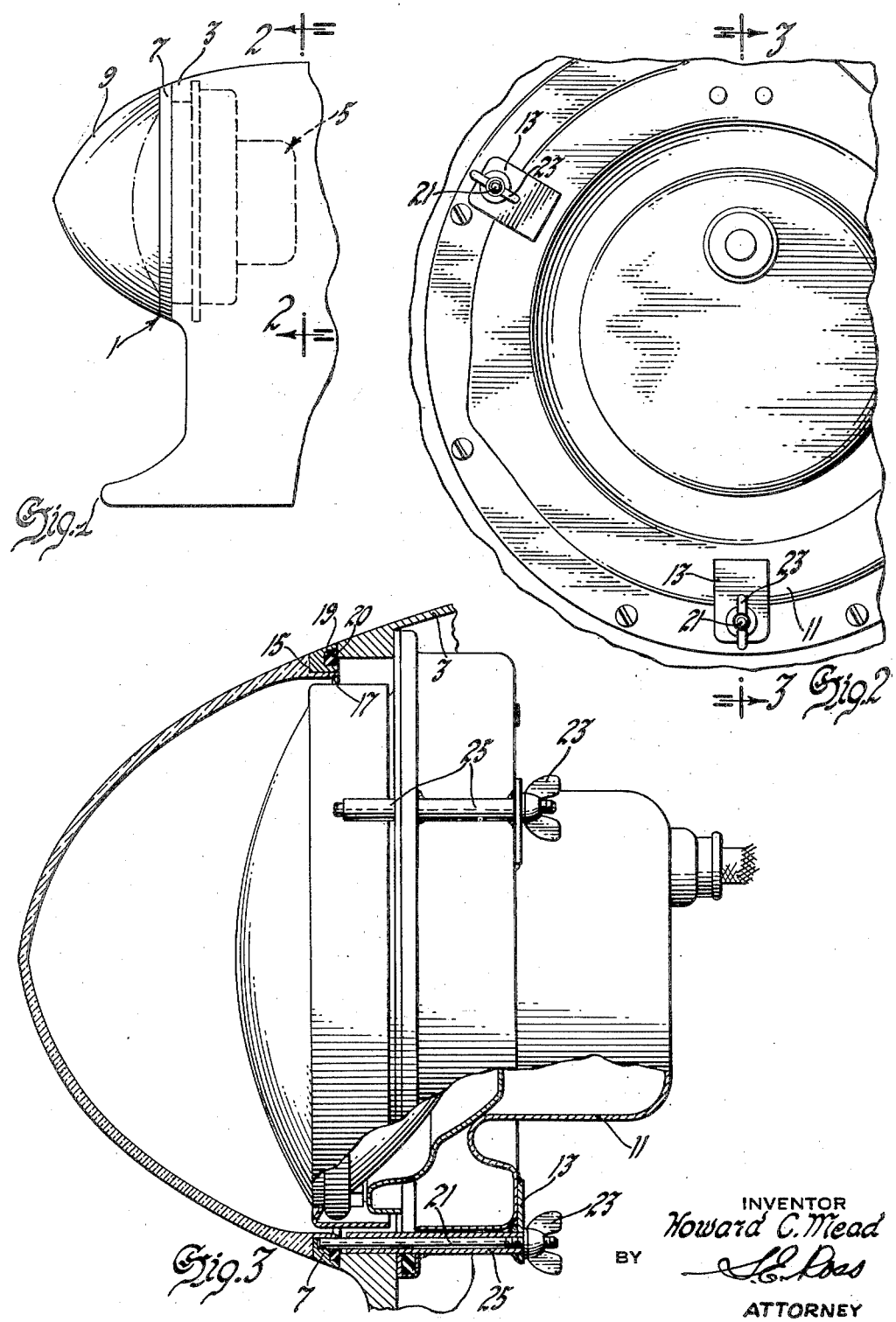

2,770,714

PLASTIC SHIELD FOR FLUSH-MOUNTED HEADLAMP

Howard C. Mead, Anderson, Ind., assignor to General Motors Corporation, Detroit, Mich., a corporation of Delaware Application May 27, 1953, Serial No. 357,751

6 Claims. (Cl. 240—8.1)

This invention relates to shields for headlamps and more particularly to a light passing shield for automotive headlamps which forms an integral part of the contour surface.

With the trend in present day automotive design toward streamlining and creation of a general reduction of flat plate area considerable time and effort have been devoted to devising a simple, rugged and inexpensive means of fastening a light passing shield to the headlamp so as to have the contour of the shield and fender or other section of the vehicle body meet as one continuous surface.

It is therefore an object of my invention to provide a simple and rugged means for attaching a headlamp shield.

It is another object of my invention to provide a simple and rugged means for attaching a light passing shield to an adapter ring.

It is still another object of my invention to provide a simple and rugged means for connecting a vehicle body contour matching light passing shield to an automotive headlamp.

These and other objects are attained in accordance with the present invention by providing a light passing streamlined shield-adapter ring assembly having attached means for clamping the assembly to the headlamp.

Further objects and advantages of the present invention will be apparent from the following description, reference being had to the accompanying drawings, wherein a preferred form of the present invention is clearly shown.

In the drawings:

Figure 1 is a plan view of the device of subject invention as combined with a standard headlamp mounted in a vehicle fender.

Figure 2 is a plan view along line 2—2 of Figure 1.

Figure 3 is a section view along line 3—3 of Figure 2, the headlamp being shown in plan view and partially broken away.

Referring now to the drawings and more particularly to Figure 1 there is shown the shield-adapter ring assembly 1 of the preferred embodiment wherein the metallic adapter ring 7 constitutes a part of the fender-shield streamline. It is also within the scope of this invention to so position the adapter ring as to have the shield surface streamline directly into the fender surface. The shield-ring assembly is shown streamlined to fender 3 in front of headlamp assembly 5 which is mounted in a fender aperture.

In the preferred embodiment shield 9 is formed of transparent clear plastic and of such contour as to blend in as a part of the fender surface contour. The shield may be formed of plastic, glass or other light passing material. The shield is thickened somewhat at its base and recessed as at 15 in order to accommodate adapter ring 7 therein. The ring is formed with a chamfer 17 on the inner edge of its base in order that the shield 9 might be easily crimped or otherwise formed or turned, i. e., hot rolling, over this edge. Crimping of the shield in this manner presents a simple yet rugged and effective manner for retaining the adapter ring on the shield. A channel 19 is provided in the base of the adapter ring for receiving a weather sealing gasket 20 of soft and pliable material such as rubber or plastic.

A plurality of stud bolts 21 are provided for fastening the ring-shield assembly to the headlamp. Bolts 21 are attached to adapter ring 7 as by brazing, welding or threaded engagement. The opposite end of each bolt is threaded to enable clamping to the headlamp. The headlamp casing 11 is provided with a plurality of plates 13 fastened to the bottom portion thereof and having holes at their outer ends for receiving the threaded ends of stud bolts 21. The installation of the shield-ring assembly on the headlamp is facilitated by the provision of bolt guide means, as for example sleeves 25 fastened to plates 13 and projecting forwardly thereof to the front of the headlamp casing.

As is readily apparent from the foregoing description, the shield assembly is easily installed on the headlamp. After fastening the headlamp to the fender or other portion of the vehicle body, the shield is attached thereto by guiding the stud bolts through the sleeves. Locking means, here shown as wing nuts 23, are then tightened on the bolts pulling the ring-shield assembly tight against the fender and thus completing the fender streamline. It is also within the scope of this invention to attach the shield-adapter assembly to the vehicle body.

While the form of embodiment of the invention as herein disclosed constitutes a preferred form, it is to be understood that other forms might be adopted, as may come within the scope of the attached claims.

What is claimed is as follows:

1. A light passing device adapted for attachment in front of a headlamp lens comprising a light passing shield, a circumferential recess in the base of said shield, a continuous metallic ring positioned in said recess, a plurality of fastening bolts attached to said ring, and a chamfer formed on at least one edge of the base of said ring, the base of said shield being turned over said edge to lock said ring within said recess and form a unitary combination therewith.

2. A light passing device adapted for attachment in front of a headlamp lens comprising a streamlined light passing shield, a circumferential recess in the base of said shield on its outer surface, a continuous metallic ring having a matching streamlined surface positioned in said recess, a plurality of fastening bolts attached to the base of said ring, and a chamfer formed on the inner edge of the ring base, the base of said shield being turned over said edge to lock said ring within said recess and form a unitary combination therewith.

3. A light passing device adapted for attachment in front of a headlamp lens comprising a streamlined transparent plastic shield having a thickened base, a circumferential recess formed in the base of said shield on its outer surface, a continuous metallic ring having a matching streamlined surface positioned in said recess, a channel in the base of said ring, a sealing gasket positioned in said channel, a plurality of equally spaced fastening bolts attached to the base of said ring, and a chamfer formed on the inner edge of the ring base, the base of said plastic shield being crimped over said edge.

4. A light passing device in combination with a lamp unit having a lens and a housing comprising a light passing shield, a recess in the base of said shield, a continuous metallic ring positioned in said recess, a plurality of fastening bolts attached to said shield, a chamfer formed on at least one edge of the ring base, the base of said shield being turned over said edge to lock said ring within said recess and form a unitary combination therewith, a plurality of plates on the lamp housing extending radially outwardly therefrom, each plate having a hole at its outer end for passing the end of said bolts and locking means for tightening the bolts in the plates.

5. A light passing device in combination with a lamp unit having a housing and lens comprising a streamlined light passing shield, a circumferential recess in the base of said shield on its outer surface, a continuous metallic ring having a matching streamlined surface positioned in said recess, a plurality of fastening bolts attached to the base of said ring, a chamfer formed on the inner edge of the ring base, the base of said shield being turned over said edge to lock said ring within said recess to form a unitary combination therewith, a plurality of plates on the lamp housing extending radially outwardly therefrom, each plate having a hole at its outer end for passing the end of said bolts and locking means for tightening the bolts in the plates.

6. A light passing device in combination with a lamp unit having a housing and lens comprising a streamlined transparent plastic shield having a thickened base, a circumferential recess formed in the base of said shield on its outer surface, a continuous metallic ring having a matching streamlined surface positioned in said recess, a channel in the base of said ring, a sealing gasket positioned in said channel, a plurality of equally spaced fastening bolts attached to the base of said ring, a chamfer formed on the inner edge of the ring base, the base of said plastic shield being crimped over said edge, a plurality of plates on the lamp housing extending radially outwardly therefrom, each plate having a hole at its outer end for passing the end of said bolts and locking means for tightening the bolts in the plates.

References Cited in the file of this patent

UNITED STATES PATENTS

| 2,096,270 | Worden | Oct. 19, 1937 |
| 2,606,772 | Mead et al. | Aug. 12, 1952 |

FOREIGN PATENTS

| 660,209 | Germany | May 18, 1938 |
| 857,985 | France | Nov. 13, 1940 |
| 1,003,396 | France | Mar. 17, 1952 |